United States Patent [19]

Schwartzman et al.

[11] Patent Number: 5,479,474

[45] Date of Patent: Dec. 26, 1995

[54] COMMUNICATION SYSTEM HAVING A REMOTE UNIT, A FIXED UNIT AND A HALF-DUPLEX COMMUNICATION CHANNEL

[75] Inventors: Zami Schwartzman, Rehovot; Aharon Kashtan, Herzelia; Claude Hasan, Petah Tikva, all of Israel

[73] Assignee: Motorola, Inc., Schaumburg, Ill.

[21] Appl. No.: 132,017

[22] Filed: Oct. 5, 1993

[30] Foreign Application Priority Data

Oct. 5, 1992 [GB] United Kingdom ............... 9220910

[51] Int. Cl.⁶ ................................................ H04M 11/00
[52] U.S. Cl. .......................... 379/58; 379/61; 379/390; 455/56.1; 455/79
[58] Field of Search ......................... 455/79, 34.1, 33.1, 455/56.1; 379/388, 390, 58, 59, 98; 340/825.72

[56] References Cited

U.S. PATENT DOCUMENTS

| | | | |
|---|---|---|---|
| 3,714,650 | 1/1973 | Fuller et al. | 379/58 |
| 3,806,804 | 4/1974 | Mills et al. | 379/58 |
| 4,378,603 | 3/1983 | Eastmond | 455/79 |
| 4,524,461 | 6/1985 | Konstanty | 455/79 |
| 4,612,415 | 9/1986 | Zdunek et al. | 455/56.1 |
| 4,715,062 | 12/1987 | Korsky | 379/390 |
| 4,715,063 | 12/1987 | Haddad | 379/390 |
| 5,014,294 | 5/1991 | Kromenaker | 379/58 |
| 5,099,508 | 3/1992 | Inaba | 379/58 |
| 5,249,302 | 9/1993 | Metroka | 455/11.1 |
| 5,263,079 | 11/1993 | Umemoto | 379/58 |
| 5,363,430 | 11/1994 | Yamagata et al. | 379/61 |

Primary Examiner—Curtis Kuntz
Assistant Examiner—William Cumming
Attorney, Agent, or Firm—M. Mansour Ghomeshi; Barbara R. Doutre; Pedro P. Hernandez

[57] ABSTRACT

A radio telephone for a vehicle is provided having means (3) for switching between a handset mode and a hands-free mode, and control means (4, 7, 8, 9, 10, 11) responsive to said means for switching, said control means controlling the telephone such that in hands-free mode the party speaking at a given time has priority in the conversation while in handset mode the party holding the handset has priority at a given time.

10 Claims, 4 Drawing Sheets

VSP MODE

| DESCRIPTION | STATE | RX VOICE DET | TX VOICE DET | SPKR | VSP MIC |
|---|---|---|---|---|---|
| BOTH SILENT | A | 0 | 0 | 0 | 0 |
| LAND TALKS | B | 1 | 0 | 1 | 0 |
| MOBILE TALKS | C | 0 | 1 | 0 | 1 |

FIG. 2

1 = ACTIVE
0 = NON-ACTIVE

HANDSET MODE

| DESCRIPTION | STATE | RX VOICE DET | TX VOICE DET | EARPIECE | HANDSET MIC |
|---|---|---|---|---|---|
| BOTH SILENT | A | 0 | 0 | 1 | 0 |
| LAND TALKS | B | 1 | 0 | 1 | 0 |
| MOBILE TALKS | C | 0 | 1 | 0 | 1 |

FIG. 3

COMMUNICATION SYSTEM HAVING A REMOTE UNIT, A FIXED UNIT AND A HALF-DUPLEX COMMUNICATION CHANNEL

FIELD OF THE INVENTION

This invention relates to a radio telephone suitable for use in a vehicle or other hands-free environment and it relates to a communications system, as well as a remote and a fixed unit of such a system, having full duplex telephone interconnecting means for connection to a telephone network and a half duplex communication channel between the remote unit and the fixed unit.

BACKGROUND TO THE INVENTION

Half duplex and full duplex telephone interconnect operations on mobile radio systems are very common and fall into a number of general categories as follows.

Half duplex radios are known with push-to-talk (PTT) activated microphones. In these radios, the user accesses a telephone interconnect voice channel in a trunking or conventional radio system and dials a telephone number. When a corresponding land user answers, the mobile user will receive his voice via a speaker and use a hand-held microphone with PTT in order to initiate conversation. A handset (i.e. with microphone and earpiece) with a PTT button can also be used. Communication is in one direction at a time only and the mobile user has full control. When the PTT is not activated, the radio automatically switches to receive.

Full duplex radios are known with hands-free operation, in which the user accesses a telephone interconnect voice channel in a trunking or conventional radio system and dials a telephone number. When the land user answers, the mobile user receives his voice via a speaker and can use a hands-free vehicular speaker phone (VSP) microphone in order to talk. Because of the limited acoustic isolation between the receive and transmit audio paths in the vehicle cabin, the VSP microphone has to be partially or totally muted while the land user is voiced via the speaker, otherwise audio regeneration will appear. Sophisticated echo cancellers can be implemented using digital signal processors to provide hands-free full duplex operation. Unfortunately the circuitry involved is very expensive. For this reason, voice detection circuits with appropriate logic are used to decide "who is talking" and "who gets priority". Usually the land user will get priority to prevent an oscillatory condition (the land user's voice via the speaker can activate the voice detector of the mobiles transmit path). This arrangement actually yields a half duplex link, each of the users having to wait for the other party to finish before he starts talking. Common Motorola mobile cellular phones use this method. The land user has the priority and can break in with full volume at any time. The mobile user can break into the land user's transmissions with an attenuated level only (20–30 db down to normal) to attract the land user's attention. Sometime the low level audio is not sufficient to stop the land user's sentence and the mobile user has to pick up the handset to break in with full volume (real full duplex). When the user picks up the handset, a real full duplex link is established as in any regular home type telephone.

As well as the use of voice detection circuits for muting audio in full duplex radios and full duplex hands-free telephones for the purpose of isolation between receive and transmit paths, voice activity detectors are known in digital cellular radio systems (at both ends of a duplex communication channel) for switching into discontinuous mode transmission for battery saving and spectrum efficiency. Discontinuous mode transmission is a technique used in a full duplex digital link for preventing the transmission of carrier when there is no voice on the channel.

Voice detectors are also common in high frequency single-side-band radios. These are half duplex conventional radios where, in a radio-to-radio communication the voice operated switch is used as a PTT. Each party must wait for the other party to finish speaking before transmitting.

Among the drawbacks of a full duplex radio in a telephone interconnect system (when compared with a half duplex radio), are the following: a duplexer filter is essential to separate the receive and transmit signals and keep receiver performance at an acceptable level, this being expensive and bulky; receive and transmit frequencies must be well separated to make the required duplexer filtering achievable and this has spectrum allocation problems; at VHF, UHF and below, duplexers are currently even more bulky and expensive than at 800 MHz and above and need tuning for customer frequencies; at VHF and UHF trunking frequencies, duplexers are not feasible unless well separated frequencies are assigned for the site repeaters; full duplex radio has to handle continuous operation (telephone conversations often take up to 30 minutes or longer) at full power, so that immense heat dissipation capability is required (for example a 25 W output power radio at 800 MHz will have to dissipate up to 120 W continuously while the conversation is in progress); and a dual synthesizer loop or side step oscillator is essential provide to receive/transmit isolation.

By contrast to the above, a half duplex radio for a telephone interconnect system would have certain advantages including: wideband operation with antenna switching and no duplexer is required; transmit and receive frequency separation is not an issue; power amplifier RF power is well coupled to the antenna with very little loss; operation can be achieved in most bands with small size and low cost; there is lower heat dissipation (for the same output power, approximately 30% of the heat is dissipated compared to full duplex, due to the better efficiency and average of 50% transmit/receive duty cycle); and a single synthesizer loop can handle both the receive and transmit requirements.

GB patent application publication no. 2,021,902 describes a helmet-mounted half duplex radio-to-radio system having voice actuated circuitry that controls the transmit/receive mode of operation with no full duplex telephone connection. U.S. Pat. No. 4,524,461 also describes a helmet-mounted radio transceiver which has voice actuated circuitry that controls the transmit/receive mode of operation. The arrangement is generally half-duplex although a full duplex mode is described which requires two radio channels. In the latter arrangement, speaking into the microphone only disables the radio receiver.

It would be desirable to devise a communication system having the benefits of a half-duplex radio communication channel with improved management of a voice conversation between a land-line party and a mobile radio party.

SUMMARY OF THE INVENTION

According to a first aspect of the present invention, a remote unit of a communications system is provided comprising a remote unit, a fixed unit having full duplex telephone interconnect means for connection to a telephone network and a communications channel therebetween. The remote unit comprises: a microphone and a near-end voice detector for detecting voice at the microphone; a radio receiver for receiving signals over the channel; a transmitter for transmitting voice-carrying radio signals over the channel; and means responsive to the detectors for switching the remote unit to receive mode, for receiving a signal over the channel, when the near end voice detector does not detect voice ("handset" mode A or B) and unconditionally switching the remote unit to transmit mode ("handset" mode C), for transmitting a signal over the channel, when the near end detector detects near end voice.

In this manner, automated half duplex operation can take place between the remote unit and the telephone network under the control of the remote unit.

Accordingly the user of the remote unit has the ability to cause the conversation to change from the land-line user speaking to the radio user speaking. This feature is particularly important where the radio equipment is usually the more costly element in the link (and indeed the use of the radio channel is frequently costly and is frequently billed to the radio user). For this reason, it is particularly beneficial for the radio user to control the conversation.

According to a second aspect of the invention, a remote unit of a communications system is provided comprising a remote unit, a fixed unit having full duplex telephone interconnect means for connection to a telephone network and a communications channel therebetween. The remote unit comprises: switch means for switching between a hands-free mode and a handset mode; at least one microphone and a near-end voice detector for detecting voice at the at least one microphone; a radio receiver for receiving signals over the channel; a far end voice detector for detecting voice carried by signals received over the channel; and a transmitter for transmitting radio signals over the channel. Means are provided, responsive to the detectors when in hands-free mode, for switching the remote unit to a default receive mode, for receiving a signal over the channel, when neither voice detector detects voice (mode A), switching the remote unit to an active receive mode (VSP mode B), for receiving a signal over the channel, when in default receive mode and the far end detector detects far end voice and maintaining it in that mode regardless of detection of voice by the near end voice detector and switching the remote unit to transmit mode (VSP mode C), for transmitting a signal over the channel, when in default receive mode and the near end detector detects near end voice. Means are also provided responsive to the detectors when in handset mode, for switching the remote unit to receive mode, for receiving a signal over the channel, when the near end voice detector does not detect voice ("handset" mode A or B) and switching the remote unit to transmit mode ("handset" mode C), for transmitting a signal over the channel, when the near end detector detects near end voice.

In this manner, automated half duplex operation can take place between the remote unit and the telephone network with equal rights between the remote unit and the telephone network.

The invention further provides, in a preferred aspect, the ability to switch between the first aspect and the second aspect, at the control of the radio user. Accordingly, a radio telephone for a vehicle is provided having means for switching between a handset mode and a hands-free mode, and control means responsive to said means for switching, said control means controlling the telephone such that in hands-free mode, the party speaking at a given time has priority in the conversation, while in handset mode, the party using or holding the handset has priority at a given time. The switching means is preferably the on-hook switch of a cradle-mounted handset.

Thus, where the mobile user believes the land-line user is talking too much (in hands-free mode), he can lift the handset and he then changes into a mode in which, by speaking into the microphone at the handset, the mobile radio transmits over the half-duplex link and the radio user has, in effect, taken control of the conversation.

Delay means may be provided responsive to the far end voice detector for delaying switching to transmit mode for at least a predetermined time after the far end voice detector detects a cessation of voice.

An acoustic speaker is preferably provided and means for outputting comfort noise from the speaker when the remote is in receive mode and the far end voice detector does not detect far end voice.

The far end voice detector is preferably adapted to distinguish voice from telephone line noise and the near end voice detector is preferably adapted to distinguish voice from vehicle cabin noise.

Other aspects of the invention include a system comprising a remote unit and a fixed unit and a fixed unit per se, as defined in the claim.

In this way, a half-duplex link can be used in an arrangement where full-duplex conversation is simulated and a highly convenient conversation management procedure is devised.

BRIEF DESCRIPTION OF THE DRAWINGS

A preferred embodiment of the invention will now be described, by way of example, with reference to the drawings, in which:

FIGS. 2 and 3 show tables illustrating the logic states of the elements of FIG. 1;

DETAILED OF THE PREFERRED EMBODIMENT

Figure 1:
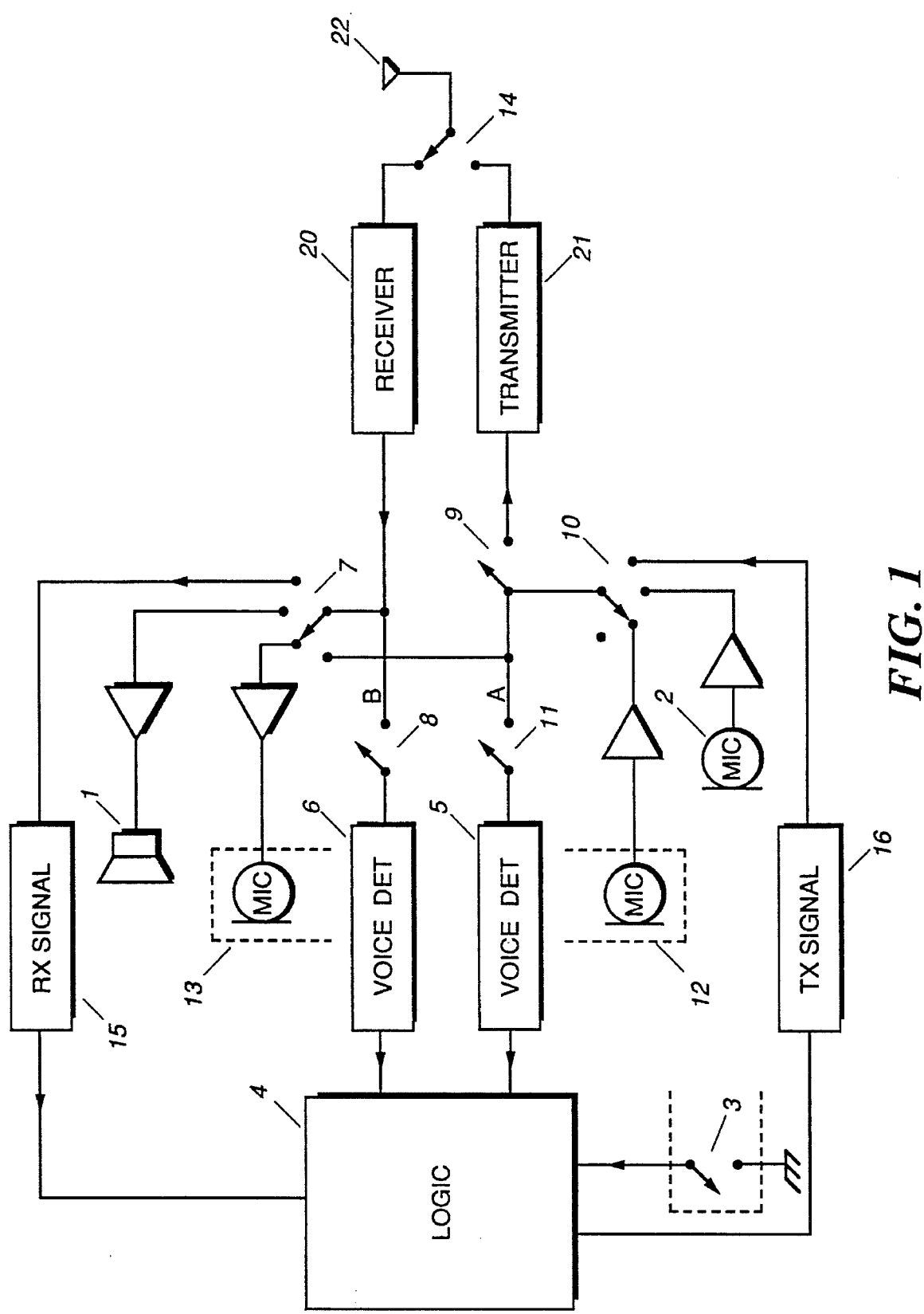
FIG. 1 shows circuitry of a mobile radio in accordance with the invention.

Referring to FIG. 1, the mobile part of the communication system of the preferred embodiment comprises a half duplex mobile radio transceiver having a speaker 1, a VSP microphone 2, a handset (indicated by a dotted line) having a microphone 12 and an earpiece 13, a handset hang up switch 3, logic circuitry 4 and at least two voice detectors 5 and 6.

The half duplex mobile radio transceiver comprises receiver circuitry 20 and transmitter circuitry 21 selectively connected by antenna switch 14 to an antenna 22. Receiver circuitry 20 is connected via audio switch 8 to voice detector 6 and transmitter 21 is connected by audio switch 9 and audio switches 7 and 10 to microphones 13 and 12 respectively. Switches 9, 10 and 7 connect to point A, to which voice detector 5 is also connected via switch 11. Switches 7 and 10 are 4-way switches. The common pole of switch 10 is connected to point A and the common pole of switch 7 is connected to point B on the path between the receiver 20 and switch 8.

Also shown in FIG. 1 is receive signalization circuitry 15 and transmit signalization circuitry 16, each connected to one of the poles of switches 7 and 10 respectively and each connected to the logic circuitry 4.

The switches 7, 8, 9, 10, 11 and 14 are all controlled by the logic circuitry 4 and the various states of these switches are described in FIGS. 2 and 3.

FIGS. 2 and 3 represents the possible states of the voice detectors 5 and 6 and the various switches in VSP mode and handset mode respectively. The VSP mode is selected when switch 3 is closed, i.e. the handset "on hook". Handset mode is selected when switch 3 is open, i.e. the handset has been lifted off its cradle (not shown).

Figure 4:
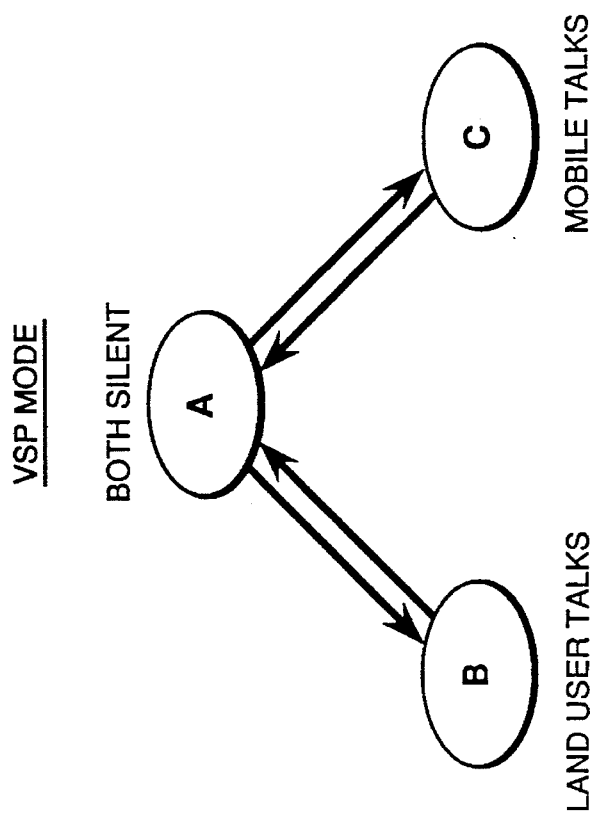

Referring to FIG. 2, three states of operation are shown, labeled A, B and C. These three states are also shown in FIG. 4. In this (VSP) mode the operation is as follows. When both the mobile party and the land party are silent, the apparatus is in state A, in which switch 14 connects antenna 22 to receiver 20 and receiver 20 is in operation. Switch 8 is closed and receive voice detector 6 detects no voice from receiver 20. Switch 9 is open, switch 11 is closed and switch 10 connects point A to VSP microphone 2. Voice detector 5 detects no voice from VSP microphone 2 and the apparatus remains in this state until one or other of the users begins talking. In the event that the land user commences talking, receive voice detector 6 detects this voice and the voice is simultaneously output through speaker 1 via switch 7. At this point switch 11 is opened so as to de-activate voice detector 5 and switch 10 disconnects VSP microphone 2. Unless the apparatus is switched to handset mode, it remains in this state until the land user finishes talking, at which point it returns to state A by closing switch 11 and re-connecting VSP microphone 2.

If the apparatus is in state A and the mobile user starts talking, transmit voice detector 5 detects voice from VSP microphone 2 and the apparatus switches to transmit mode, where switch 9 is closed, switch 14 changes over to transmitter 21 and switch 8 is opened. Thus, voice detector 6 is de-activated and the apparatus remains in this mode until either the mobile user finishes talking, causing the apparatus to return to mode A, or the handset is lifted and the apparatus changes to handset mode. It will be noted, however, that switching to handset mode from mode C has no immediate effect other than to switch the audio from speaker 1 to earpiece 13 by movement of switch 7.

As shown in FIG. 4, in the VSP mode, operation can pass from mode A to mode B and back, or from mode A to mode C and back, but not between modes B and C.

Figure 5:
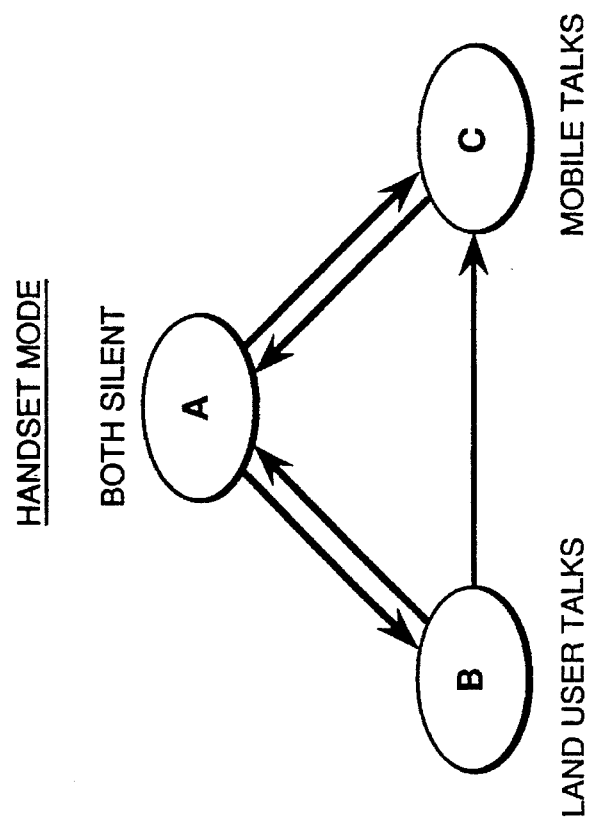
FIGS. 4 and 5 show transitions between different modes of operation of the circuit of FIG. 1.

Consider now the case where the land user is talking in the VSP mode, i.e. mode B, and the mobile user wishes to break into the conversation. The mobile user is unable to break into the conversation while in VSP mode so he lifts the handset from the cradle and switch 3 opens. This causes handset mode to be entered and the table of FIG. 3 applies and the operation is illustrated in FIG. 5. Operation is similar to the VSP mode with the exception that while switch 14 is switched to the receiver, switch 10 connects microphone 12 to point A, switch 8 is closed, switch 11 is now also closed and voice detector 5 is able to detect voice at handset microphone 12. If, when in handset mode B (land user talking) the mobile user breaks into the conversation, the voice entered at microphone 12 is detected by voice detector 5 and this immediately causes the logic 4 to switch the transceiver from receive mode into transmit mode by switching over switch 14 and closing switch 9. Switch 8 is opened and operation proceeds as for VSP mode C.

As shown in FIG. 5, when in handset mode, operation can proceed from mode A to mode B and back, or from mode A to mode C and back, but this time operation can also immediately pass from mode B to mode C merely by the mobile user commencing to talk.

It will be noted that in both cases mode A is a "default" or "standby" mode where neither party is talking, but the unit is operating to receive so that it is ready to detect incoming received voice and to detect outgoing voice entered into the microphone.

Received signalization circuitry 15 and transmit signalization circuitry 16 are controlled by logic 4 to set up the radio communication link in accordance with appropriate communication protocol and to perform other signaling functions when necessary.

The voice detectors 5 and 6 do not have to be identical and it is preferred that the far-end voice detector 6 is optimized to detect telephone-type voices and distinguish these from telephone-line background noise and the near-end voice detector 5 is optimized to a mobile environment with vehicle cabin background noise. Different voice detectors of these different types are widely available and are known to those skilled in the art.

To give full comfort for the mobile user, the speaker 1 is preferably not muted when both users are silent. The speaker 1 is left on and the mobile user hears the background noise of the land user. This feature cannot be exactly "mirrored" for the land user.

After the land user stops talking, there is echoing in the vehicle cabin before the voice decays fully. At that moment logically both users are silent and there is a danger that the acoustic wave resident in the cabin will activate the voice detector 5. To avoid this, a delay is implemented by the control logic 4. Transmission is prevented for about 20–40 ms after the far-end user has fallen silent.

A base station is provided which is preferably a standard full-duplex trunking base station. When the land user is not talking, the base station merely transmits unmodulated carrier. The decisions taken by the mobile are taken independently of the transmissions from the base station.

Figure 6:
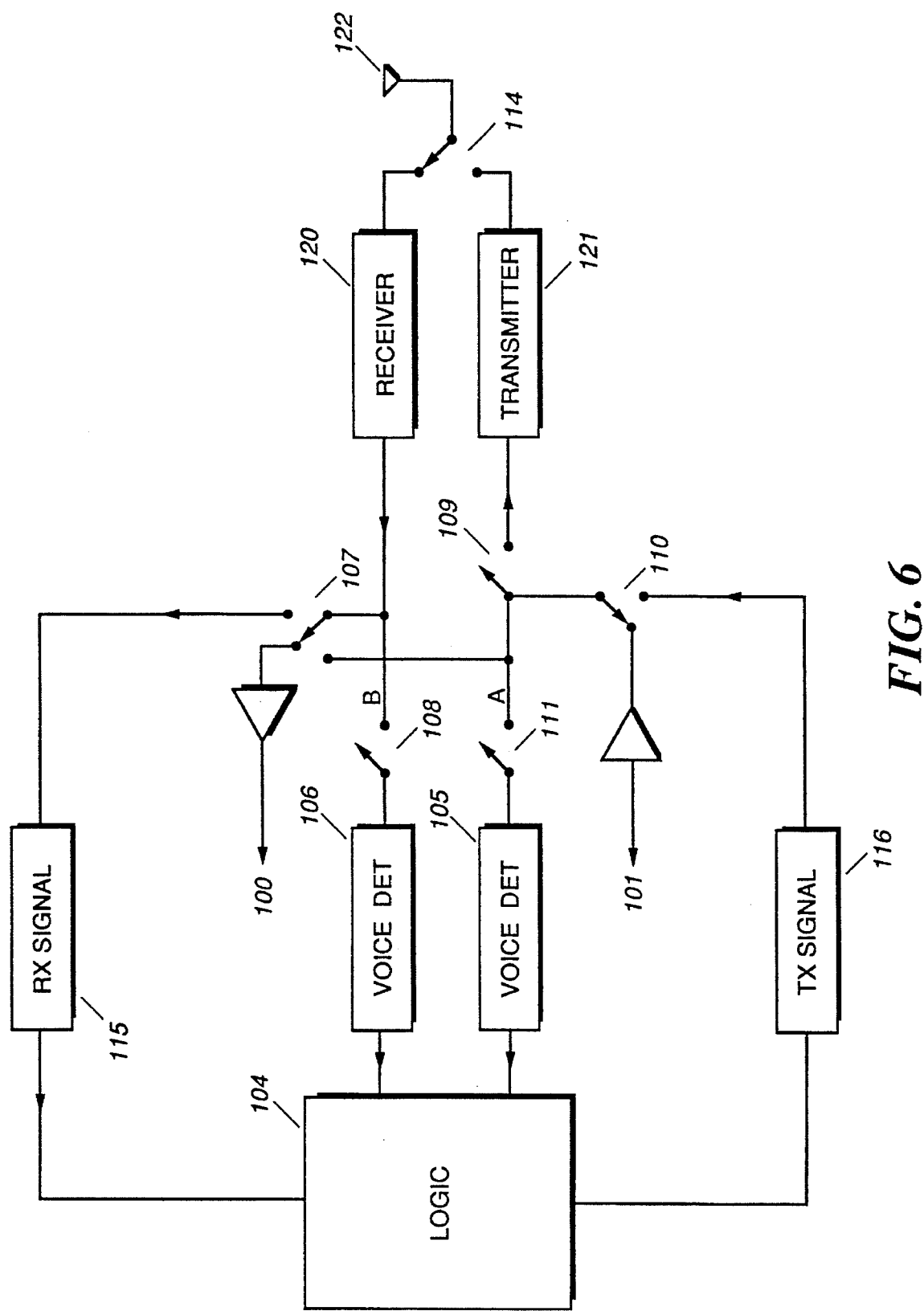
FIG. 6 shows circuitry of a fixed radio unit in accordance with the invention.

Alternatively, a base station is provided as illustrated in FIG. 6, having circuitry similar to that of FIG. 1 and having a duplex telephone interconnection 100 and 101 to a telephone network, where the telephone interconnection replaces the speaker 1 and microphone 2 (and ear piece 13 and microphone 12) of FIG. 1 Elements 4 to 11 and 14 to 22 are present in FIG. 6 as corresponding elements 104 to 111 and 114 to 122, with the exception that instead of a far-end voice detector, element 106 is a squelch detector (there is no transmission from the mobile unless the mobile user is talking, so the presence of carrier from the mobile is always indicative of voice from the mobile). There is, of course, no hook switch and only the VSP-type of operation shown in FIGS. 2 and 4 is possible, i.e. there is no provision for the land user to take over conversation from the radio user. Emergency means can be provided for this purpose local to the base station if desired.

The system described can provide both hands-free and handset operation with half duplex radios. When in VSP mode, the land user and mobile user have "equal rights"; the first who starts to talk cannot be interrupted. If the land user "talks too much" without breaks, the mobile user may choose to pick up the handset and achieve full control of the conversation with full priority. This feature is particularly advantageous, as it is frequently the mobile user who pays for the call.

The method can be implemented on current trunking and conventional systems with very low cost, featuring a very beneficially hands-free telephone conversation capability together with safe driving.

What is claimed is:

1. A remote unit of a communications system comprising a remote unit, a fixed unit having full duplex telephone interconnect means for connection to a telephone network and a communications channel therebetween, the remote unit comprising:

switch means for switching between a hands-free mode and a handset mode;

at least one microphone and a near-end voice detector for detecting voice at the at least one microphone;

a radio receiver for receiving signals over the channel;

a far end voice detector for detecting voice carried by signals received over the channel;

a transmitter for transmitting radio signals over the channel;

means responsive to the detectors, when in hands-free mode, for switching the remote unit to a default receive mode, for receiving a signal over the channel, when neither voice detector detects voice, switching the remote unit to an active receive mode, for receiving a signal over the channel, when in default receive mode and the far end detector detects far end voice and maintaining it in that mode regardless of detection of voice by the near end voice detector and switching the remote unit to transmit mode, for transmitting a signal over the channel, when in default receive mode and the near end detector detects near end voice; and means responsive to the detectors, when in handset mode, for switching the remote unit to receive mode, for receiving a signal over the channel, when the near end voice detector does not detect voice and switching the remote unit to transmit mode, for transmitting a signal over the channel, when the near end detector detects near end voice.

2. A remote unit according to claim 1, further comprising a handset having the at least one microphone mounted therein, a handset cradle for holding the handset and a hook switch operated by lifting the handset from the handset cradle, said hook switch providing the switch means for switching between the hands-free mode and the handset mode.

3. A remote unit according to claim 2 comprising first and second microphones, the first microphone being mounted in the handset and the second microphone being mounted in association with the cradle and microphone-voice detector coupling means for coupling the second microphone to the near end voice detector when in hands-free mode.

4. A remote unit according to claim 1, further comprising delay means responsive to the far end voice detector for delaying switching to transmit mode for at least a predetermined time after the far end voice detector detects a cessation of voice.

5. A remote unit according to claim 1 comprising an acoustic speaker and means for outputting noise from the speaker when in receive mode and the far end voice detector does not detect far end voice.

6. A remote unit according to claim 1 wherein the far end voice detector provides a means to distinguish voice from telephone line noise and the near end voice detector is adapted to distinguish voice from vehicle cabin noise.

7. A communications system comprising:

a remote unit;

a fixed unit having full duplex telephone interconnect means for connection to a telephone network and a half duplex communications channel therebetween;

the remote unit comprising:

a microphone and a near-end voice detector for detecting voice at the microphone;

a radio receiver for receiving signals over the channel;

a far end voice detector for detecting voice carried by signals received over the channel;

a transmitter for transmitting voice-carrying radio signals over the channel; and means responsive to the detectors for switching the remote unit to a default receive mode, for receiving a signal over the channel, when neither voice detector detects voice, switching the remote unit to an active receive mode, for receiving a signal over the channel, when in default receive mode and the far end detector detects far end voice and maintaining it in that mode regardless of detection of voice by the near end voice detector and switching the remote unit to transmit mode, for transmitting a signal over the channel, when in default receive mode and the near end detector detects near end voice;

and the fixed unit comprising a full-duplex radio transceiver.

8. A communications system comprising: a remote unit; a fixed unit having full duplex telephone interconnect means for connection to a telephone network and a half-duplex communications channel therebetween;

the remote unit comprising:

a microphone and a near-end voice detector for detecting voice at the microphone;

a radio receiver for receiving signals over the channel;

a far end voice detector for detecting voice carried by signals received over the channel;

a transmitter for transmitting voice-carrying radio signals over the channel; and means responsive to the detectors for switching the remote unit to a default receive mode, for receiving a signal over the channel, when neither voice detector detects voice, switching the remote unit to an active receive mode, for receiving a signal over the channel, when in default receive mode and the far end detector detects far end voice and maintaining it in that mode regardless of detection of voice by the near end voice detector and switching the remote unit to transmit mode, for transmitting a signal over the channel, when in default receive mode and the near end detector detects near end voice;

and the fixed unit comprising:

a near-end voice detector coupled to the telephone interconnect means for detecting voice received from the telephone network;

a radio receiver for receiving signals over the channel;

a far end signal detector for detecting signals received over the channel;

a transmitter for transmitting voice-carrying radio signals over the channel; and means responsive to the detectors for switching the fixed unit to a default receive mode, for receiving a signal over the channel, when neither voice detector detects voice, switching the fixed unit to an active receive mode, for receiving a signal over the channel, when in default receive mode and the far end detector detects a far end signal and maintaining it in that mode regardless of detection of voice by the near end voice detector and switching the fixed unit to transmit mode, for transmitting a signal over the channel, when in default receive mode and the near end detector detects near end voice, whereby automated half duplex operation can take place between the remote unit and the telephone network with equal rights between the remote unit and the telephone network.

9. A communications system comprising: a remote unit; a fixed unit having full duplex telephone interconnect means for connection to a telephone network and a half-duplex communications channel therebetween;

the remote unit comprising:
- a microphone and a near-end voice detector for detecting voice at the microphone;
- a radio receiver for receiving signals over the channel;
- a far end voice detector for detecting voice carried by signals received over the channel;
- a transmitter for transmitting voice-carrying radio signals over the channel; and
- means responsive to the detectors for switching the remote unit to receive mode, for receiving a signal over the channel, when the near end voice detector does not detect voice and switching the remote unit to transmit mode, for transmitting a signal over the channel, when the near end detector detects near end voice;

and the fixed unit comprising:
- a near-end voice detector coupled to the telephone interconnect means for detecting voice received from the telephone network;
- a radio receiver for receiving signals over the channel;
- a radio transmitter for transmitting voice-carrying radio signals over the channel; and
- means responsive to the remote unit for receiving a signal over the channel, when the remote unit is in transmit mode and
- means responsive to the near end voice detector for switching the fixed unit to a transmit mode, for transmitting a signal over the channel, when the remote unit is not in transmit mode and the near end detector detects near end voice, whereby automated half duplex operation can take place between the remote unit and the telephone network under the control of the remote unit.

10. A communications system comprising a remote unit, a fixed unit and a half-duplex communications channel therebetween, the fixed unit comprising:
- a near-end voice detector coupled to a telephone interconnect means for detecting voice received from a telephone network;
- a radio receiver for receiving signals over the channel;
- a radio transmitter for transmitting radio signals over the channel;
- means responsive to the remote unit for receiving a signal over the channel, when the remote unit is in transmit mode and
- means responsive to the near end voice detector for switching the fixed unit to a transmit mode, for transmitting a signal over the channel, when the remote unit is not in transmit mode and the near end detector detects near end voice.

* * * * *